United States Patent
Wray (10) Patent No.: US 7,552,328 B2
(45) Date of Patent: Jun. 23, 2009

(54) SECURITY ATTRIBUTES OF NODES IN TRUSTED COMPUTING SYSTEMS

(75) Inventor: Michael John Wray, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 896 days.

(21) Appl. No.: 10/810,348

(22) Filed: Mar. 26, 2004

(65) Prior Publication Data

US 2005/0039003 A1 Feb. 17, 2005

(30) Foreign Application Priority Data

Mar. 28, 2003 (GB) ................. 0307190.9

(51) Int. Cl.
*G06F 21/00* (2006.01)
(52) U.S. Cl. .................................. 713/166
(58) Field of Classification Search .......... 713/166
See application file for complete search history.

(56) References Cited

U.S. PATENT DOCUMENTS

| 5,915,085 | A | 6/1999 | Koved | ............. | 395/186 |
| 6,430,561 | B1 * | 8/2002 | Austel et al. | ............. | 707/9 |
| 2002/0077803 | A1 | 6/2002 | Kudoh et al. | ............. | 704/1 |

FOREIGN PATENT DOCUMENTS

| GB | 2 376 764 | 12/2002 |
| GB | 2 379 764 | 3/2003 |
| WO | 00/48063 | 8/2000 |
| WO | 00/54125 | 9/2000 |

OTHER PUBLICATIONS

U.S. Appl. No. 10/810,308, filed Mar. 26, 2004, Wray.
Dalton, C.I., et al., "Applying Military Grade Security to the Internet," *Computer Networks and ISND Systems*, vol. 29, pp. 1799-1808 (1997).
"Trusted Computing Platform Alliance (TCPA), TCPA Design Philosophies and Concepts," Version 1.0, Internet: <http://www.trustedpc.org> pp. 1-30 (Jan. 2001).

* cited by examiner

*Primary Examiner*—Andrew L Nalven (57) ABSTRACT

A system and method for resolving a rule conflict within a security policy applied to a trusted computing platform, wherein the fileset to which each of the conflicting rules v and s refers (or "scope") is determined (step 10). It is then determined (at step 12) if the scope of one of the rules s is a complete subset of the scope of rule r. If so, rule s is applied to the accessed file f (at step 14). If not, the conflict is resolved in another way, for example, by determining the most restrictive of rules r and s (at step 16) and applying the result accordingly (step 18).

10 Claims, 6 Drawing Sheets

SECURITY ATTRIBUTES OF NODES IN TRUSTED COMPUTING SYSTEMS

FIELD OF THE INVENTION

This invention relates generally to the security policy employed in trusted computing systems and, more particularly, to a method and apparatus for defining security attributes in respect of access capabilities of files and permitted access to system resources in trusted computing systems.

BACKGROUND TO THE INVENTION

For commercial applications, a client computing platform typically operates in an environment where its behaviour is vulnerable to modification by local or remote entities. This potential insecurity of the platform is a limitation on its use by local parties who might otherwise be willing to use the platform, or remote parties who might otherwise communicate with the platform; for example, for the purposes of E-commerce.

In the applicant's co-pending disclosure WO 00/48063, incorporated herein by reference, there is disclosed the concept of a 'trusted computing platform' comprising a computing platform which has a 'trusted component' in the form of a built-in hardware and software component. This document describes the use of a Trusted Device (TD) or Trusted Platform Module (TPM) to enable verification of the integrity of computing apparatus by the reliable measurement and reporting of integrity metrics. A TD/TPM conforms to the Trusted Computing Platform Alliance (TCPA) specification, see for example www.trustedpc.org.

A Trusted Device or Trusted Platform Module may include one or more logically protected computing environments or "compartments" within which a service or process may be run. The actions or privileges within a compartment are constrained, particularly to restrict the ability of a process to execute methods and operations which have effect outside the compartment, such as methods that request network access or access to files outside of the compartment. Also, operation of a process or service within a compartment is performed with a high level of isolation from interference and prying by outside influences. The or each compartment may be an operating system compartment controlled by an operating system kernel. This is also referred to as a compartmented operating system or a trusted operating system.

Trusted operating systems have been available for several years in a form designed for handling and processing classified (military) information, using a containment mechanism enforced by a kernel of the operating system with mandatory access controls to resources of the computing platform such as files, processes and network connections. The operating system attaches labels to the resources and enforces a security policy which governs the allowed interaction between these resources based on their label values. Many trusted operating systems apply a security policy based on the Bell-Lapadula model discussed in the paper "Applying Military Grade Security to the Internet" by C I Dalton and J F Griffin published in Computer Networks and ISDN Systems 29 (1997) 1799-1808.

In any event, many trusted computing platforms adopt a relatively simple and convenient form of operating system compartment. As a general rule, each resource of the computing platform which it is desired to protect is given a label indicating the compartment to which that resource belongs. Mandatory access controls, incorporating a security policy, are performed by the kernel of the host operating system to ensure that resources from one compartment cannot interfere with resources from another compartment. In a secure system, access to system resources is defined by security or subject attributes.

The above-mentioned security policy tends to be expressed in the form of security rules (each generally comprising an instruction line defining security attributes). In general, one or more security rules are associated with a compartment, and each compartment may be associated with one or more services. File rules may be used to define mandatory access controls in addition to the usual discretionary access control. In general, a file rule has a comp field defining which compartment the rule applies to, and a filename field defining the directory or file the rule applies to. File rules on a directory apply to the directory and all files reachable from the directory. The access permitted by a file rule is defined by its access field.

The forms of access, in one known system, are read, write, append, execute. For most file operations, the operation is only permitted if the access requested by the operation is granted by the applicable file rules, or there are no applying file rules.

Consider the case where a website under /compt/web is running in compartment web. To prevent the website being defaced, a read-only rule may be put on /compt/web:

file [comp web; filename /comp/web; access read;]

However, the webserver may need to write logs, so read-write access may be given to /compt/web/logs:

file [comp web; filename /comp/web/logs; access read, write]

The intention is that a file rule defines the maximum permission of files reachable from its filename. In some conventional systems, where a file is reachable from the filename in more than one rule, the "most specific" rule is used, i.e. the one with the longest filename. If there is no rule applying to a file, its permissions are not constrained, and the usual permissions specified on the file control operations on it. Rules for different compartments tend to be treated independently.

However, this definition of the behaviour has been found to be inadequate. In some known systems, the filesystem maps filenames onto the files themselves, which are identified uniquely by device number and inode number. Many filenames can resolve to the same file because of the presence of hard links, symbolic links, multiple mounts and mounts using —bind to mount one directory on another. This may be called 'filename aliasing', and it means that it is not always clear when more than one rule applies to a file, or indeed if any rule applies to a file. In addition, there is also the problem of rule conflict, in the sense that filename aliasing means that two rules with different filenames can have some files to which only one rule applies, and some files to which both rules potentially apply.

Figure 3:
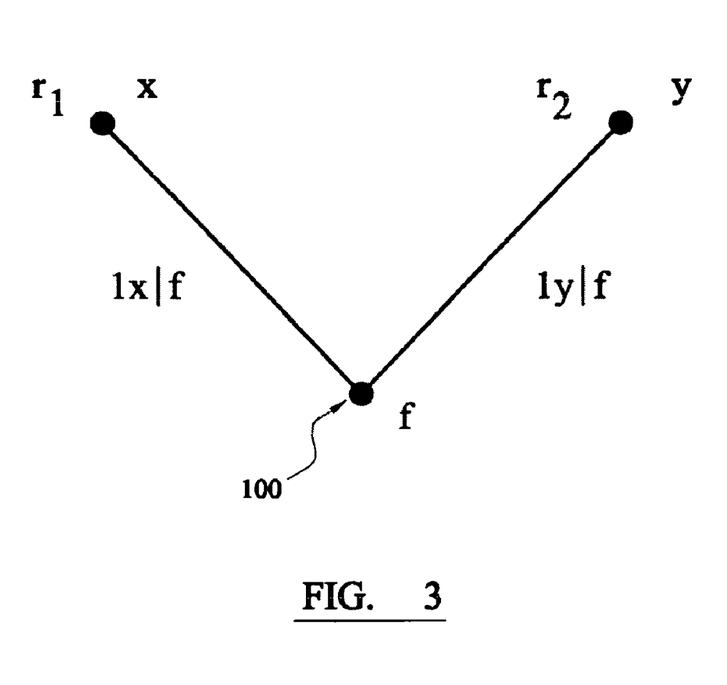
FIG. 3 is a schematic diagram illustrating a simplified filesystem.

Referring to FIG. 3 of the drawings, consider the following file rule $r_1$:

file [comp web; filename /x; access read;]

Thus, if a user were to try and write to a file /x/f from compartment web, it will fail with operation not permitted (because directory x has read-only access defined by $r_1$, which also applies to /x/f). However, consider the case that another directory /y also exists, to which rule $r_2$ applies:

file [comp web; filename /y; access read, write]

A user could create a hard link to /x/f called /y/f because they have write access to /y and only need read access to /x/f to create the link. Thus, if filename /y/f is accessed, this will resolve to the same inode 100 as /x/f but the kernel dentry will show /y as the parent and will apply $r_2$ even though $r_1$ should be applied, without knowing that /y/f is an alias for a file /x/f.

On the other hand, if /y/f were a symbolic link to /x/f, the kernel dentry for the inode 100 has /x as the parent and $r_1$ would be correctly applied.

Figure 4:
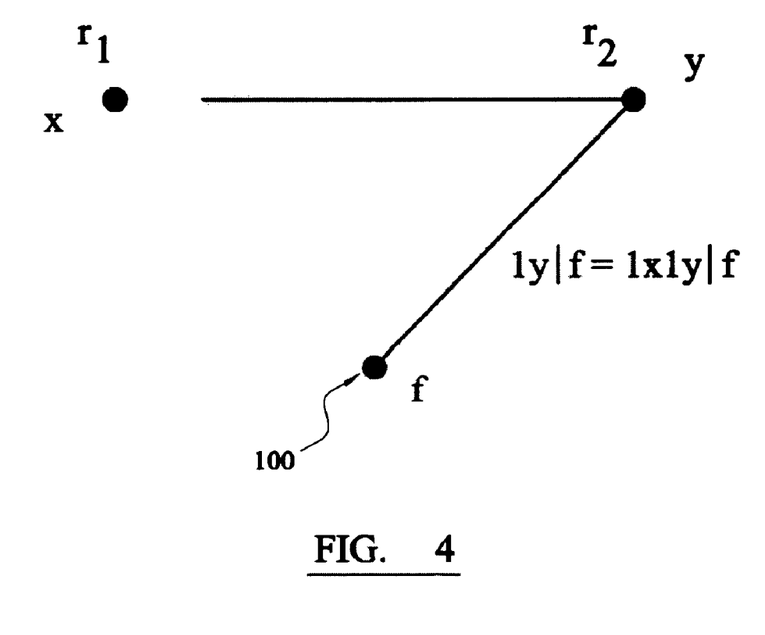
FIG. 4 is a schematic diagram illustrating another simplified filesystem.

On the other hand, referring to FIG. 4 of the drawings, suppose a symbolic link /x/y is provided to /y. Then the filename /x/y/f resolves to the same file inode 100 as y/f, so on the face of it $r_1$ should apply to /x/y/f. However, the kernel would resolve /x/y/f to a dentry for /y/f, since /x/y is a symbolic link.

File aliases can also be produced by mounting the same filesystem on more than one directory. Although hard-linking to a directory can be prevented, a similar effect can be produced in one known system using a 'mount-bind' command which allows a directory to be mounted on any other directory, effectively linking the mount point to the directory mounted.

Websites can be defaced by attackers using buffer overflow bugs in the webserver to get it to run their code and write to the website files. The exemplary website rules given above are intended to prevent this, even if the webserver has a buffer overflow bug. However, they do not effectively achieve this in all cases, unless the issue of filename aliasing is resolved. Otherwise, an attacker can cause the webserver to create a hard link in /compt/web/logs (which has read-write access) to file under/compt/web (which only has read access). The attacker can then access the file via the hard link, by-passing the read-only protection, so the rules do not necessarily prevent the website being defaced, unless the issue of filename aliasing is resolved.

Furthermore, in some known systems, a security policy is used which classifies files into types and then defines the access permitted on the basis of the types. Classification is done as a separate phase and the results are stored. Files are not reclassified when they are renamed, or when links to them are created, and the classification process must instead be run manually when the policy is changed. This is clearly inconvenient and time-consuming, not to mention complicated and prone to error.

SUMMARY OF THE INVENTION

Thus, in accordance with the present invention, there is provided a system comprising a trusted computing platform, one or more logically protected computing environments and a filesystem comprising a plurality of files and links defining access paths between said files, the system being arranged to load onto said trusted computing platform a predetermined security policy including a plurality of security rules in respect of one or more of said logically protected computing environments and/or said files, the system being further arranged to determine that first and second security rules apply to a specified file or set of files, determine the complete set of files (or fileset) to which each of said first and second security rules applies, determine if the fileset of said first security rule is a complete subset of the fileset of said second security rule, and if so, apply said first security rule to said specified file or set of files, and otherwise, select one of said first and second security rules on the basis of another attribute thereof, and apply the selected security rule to said specified file or set of files.

It will be appreciated that the security rules may define access controls and/or modify security attributes, as explained in more detail later.

Also in accordance with the present invention, there is provided a method of applying a predetermined security policy to a system having a trusted computing platform, one or more logically protected computing environments and a filesystem comprising a plurality of files and links defining access paths between said files, said security policy including a plurality of security rules in respect of one or more of logically protected computing environments and/or said files, the method comprising the steps of determining that first and second security rules apply to a specified file or set of files, determining the complete set of files (or fileset) to which each of said first and second security rules applies, determining if the fileset of said first security rule is a complete subset of the fileset of said second security rule, and if so, applying said first security rule to said specified file or set of files, and otherwise, selecting one of said first and second security rules on the basis of another attribute thereof, and applying the selected security rule to said specified file or set of files.

Thus, instead of trying to resolve a rule conflict entirely on the basis of the 'most specific rule' concept described above, the method and apparatus of the invention first determine if the filesystem to which one of the conflicting rules is intended to apply is a complete subset of the filesystem to which the other security rule is intended to apply, and if so, apply that rule to the specified file or set of files which has been accessed. Only if the result of this determination is that neither of the conflicting rules has a filesystem (or 'scope') which is a complete subset of the other, is the conflict resolved using another method. In the case of conflicting file rules, the conflict may be resolved by determining which of the two rules is the most restrictive, and applying that rule. In the case of execution control (or exec) rules, the conflict may be resolved by selecting and applying the rule which was most recently added to the security policy. In this case at least, the system is preferably arranged to provide a warning or error message indicating to a user that a rule conflict exists.

In one embodiment of the invention, the system may include means for identifying the creation of a rule conflict when a link between files or sets of files is created, and providing an error message or warning accordingly. The system may also be arranged to remove the offending link to remove the conflict.

BRIEF DESCRIPTION OF THE DRAWINGS

An embodiment of the present invention will now be described by way of example only and with reference to the accompanying drawings, in which.

DETAILED DESCRIPTION OF THE INVENTION

In the following description, numerous specific details are set forth in order to provide a thorough understanding of the present invention. It will be apparent, however, to one skilled in the art, that the invention may be practised without limitation to these specific details. In other instances, well known methods and structures have not been described in detail so as to avoid unnecessarily obscuring the present invention.

A trusted computing platform of a type generally suitable for carrying out an embodiment of the present invention is described in detail in the applicant's International Patent Application No. PCT/GB00/00528 entitled 'Trusted Computing Platform' and filed on 15 Feb. 2000, the contents of which are incorporated herein by reference. This document describes the essential elements of the construction of a trusted computing platform, and its role in providing integrity metrics indicating the state of the computing platform to a user of that platform, and communication of such metrics to a user.

Figure 1:
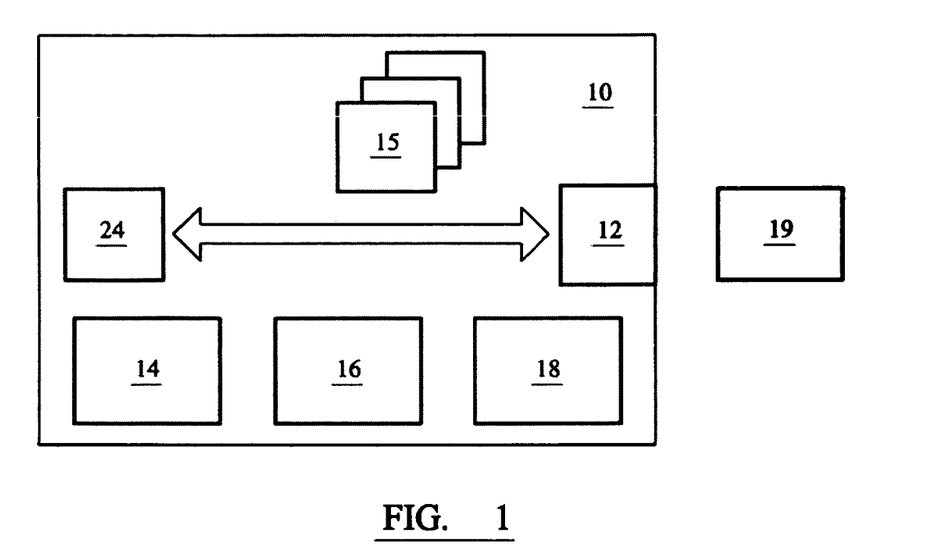
FIG. 1 is a diagram that illustrates a system capable of implementing embodiments of the present invention.

Briefly, and referring to FIG. 1 of the drawings, a trusted computing platform 10 includes the standard features of a keyboard 14, a mouse 16 and a visual display unit (VDU) 18, which provide the physical 'user interface' of the platform. This embodiment of a trusted platform also contains a smart card reader 12, although this is not essential in all embodiments of the present invention. Alongside the smart card reader 12, there is illustrated a smart card 19 to allow trusted user interaction with the trusted platform (this aspect is further described in the applicant's International Patent Application No. PCT/GB00/00751 entitled "Smartcard User Interface for Trusted Computing Platform" and filed on 3 Mar. 2000, the contents of which application are incorporated herein by reference). In the platform 10, there are a plurality of modules 15: these are other functional elements of the trusted platform of essentially any kind appropriate to that platform (the functional significance of such elements is not relevant to the present invention and will not be discussed further herein).

Figure 2:
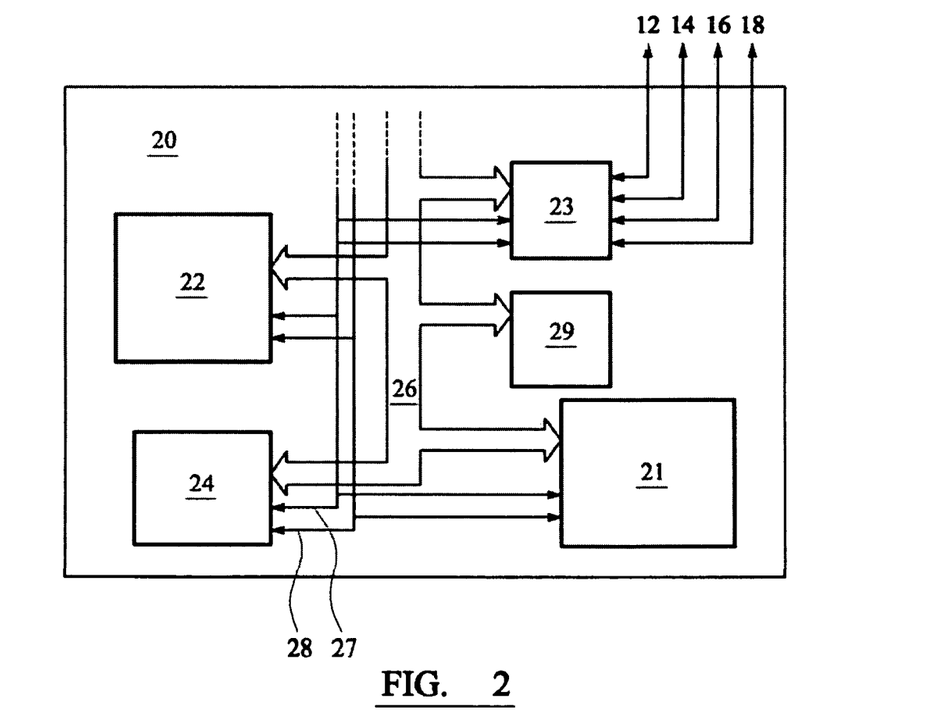
FIG. 2 is a motherboard including a trusted device arranged to communicate with a smart card reader and with a group of modules.

Referring to FIG. 2 of the drawings, the motherboard 20 of the trusted computing platform 10 includes (among other standard components) a main processor 21, main memory 22, a trusted device 24, a data bus 26 and respective control lines 27 and address lines 28, BIOS memory 29 containing the BIOS program (which, after reset, builds a proper environment within which the operating system program will be run) for the platform 10, and an input/output (I/O) devices 23, which controls interaction between the components of the motherboard and the smart card reader 12, the keyboard 14, the mouse 16 and the VDU 18. The main memory 22 is typically random access memory (RAM). In operation, the platform 10 loads the operating system into RAM from hard disk (not shown).

Thus, after reset, the main processor is initially controlled by the trusted device, which then hands control over to the platform-specific BIOS program, which in turn initialises all input/output devices as normal. After the BIOS program has executed, control is handed over to an operating system program, which is typically loaded into the main memory 22 from a hard disk drive (not shown). It is highly desirable for the BIOS boot block to be contained within the trusted device 24. This prevents subversion of the obtaining of the integrity metric (which could otherwise occur if rogue software processes are present) and prevents rogue software processes creating a situation in which the BIOS (even if correct) fails to build a proper environment for the operating system.

The structure of the trusted device 24 is described in more detail in the applicant's above-mentioned International Patent Application No. PCT/GB00/00528. The specific structure of the trusted device is not relevant to the present invention and will not be discussed further herein.

A trusted computing platform, once started up, tends to have a compartmented or trusted operating system. This means that one or more services or processes required to be supported by the operating system are run within a compartment which is a logically protected computing environment. As stated above, the actions or privileges within a compartment are constrained (by the security policy), particularly to restrict the ability of a process to execute methods and operations which have effect outside the compartment, such as methods that request network access or access to files outside of the compartment. In addition, operation of the process within the compartment is performed with a high level of isolation from interference and prying by outside influences.

In a preferred embodiment, the compartment is an operating system compartment controlled by the operating system kernel and, as stated above, this is also referred to as a compartmented operating system or a trusted operating system.

Communication between compartments and network resources is provided via narrow kernel level controlled interfaces to a transport mechanism such as TCP/UDP. Access to these communication interfaces is governed by rules specified on a compartment by compartment basis. At appropriate points in the kernel, access control checks are performed such as through the use of hooks to a dynamically loadable security module that consults a table of rules indicating which compartments are allowed to access the resources of another compartment.

In the absence of a rule explicitly allowing a cross compartment access to take place, an access attempt is denied by the kernel. The rules enforce mandatory segmentation across individual compartments, except for those compartments that have been explicitly allowed to access another compartment's resources.

In the following, two types of file security rules will be referred to, namely file rules defining mandatory access controls (MAC) in addition to normal discretionary access control (DAC); and exec rules defining how to modify the security attributes of a process when programs are executed.

In the following specific description of an exemplary embodiment of the invention, a file rule has a comp field defining which compartment the rule applies to, and a filename field defining the directory or file the rule applies to. The access permitted by a file rule is defined by its access field. In general, file rules on a directory apply to the directory and all files reachable from that directory.

In this exemplary embodiment of the invention, an exec rule has, among other fields, a from.comp field defining which compartment the rule applies to and a filename field defining the directory or file the rule applies to. In general, exec rules on a directory apply to the directory and all files reachable from that directory.

In the following, the general term 'rule' will be used to mean file or exec rule, and it is assumed that all rules have compartment fields ('comp' field in a file rule, and 'from-.comp' field in an exec rule) and filename fields, with all other fields being 'lumped' together as attributes.

The object of this exemplary embodiment of the invention is to:

eliminate any dependency on filename;

eliminate relevance of rule order;

eliminate linking attacks;

and to define the attributes conferred on a file by a set of rules in a way that satisfies these objects.

In general, if a rule r has filename /x, the rule's scope r is all files which are reachable from /x. This includes all descendants of /x if it is a directory, and all files which can be accessed by crossing mount points.

The term 'symbolic link', as referred to above, can be used if it is required to have a file or program in more than one place without having more than one copy. In exemplary embodiment, a symbolic link can be set up using:

ln -s filename linkname where filename is the name of the real file or program and linkname is the name of the link. After this has been done, "linkname" can be used instead of filename, and the correct file will still be reached.

In this exemplary embodiment of the invention, if the filename field in a rule is a symbolic link, the rule applies to everything reachable by resolving the link. If the filename in a rule is a directory, the contents of the directory and all subdirectories is recursively included in its scope, but symbolic links are not followed for various reasons.

In the following, the attributes conferred on a file f in compartment c by rule set S are defined. Notation:
S|f=the set of rules in S having file f in their scope;
$S_c$=the set of rules S having compartment c;
$S^x$=the set of exec rules in S;
$S^F$=the set of file rules in S.

Figure 5:
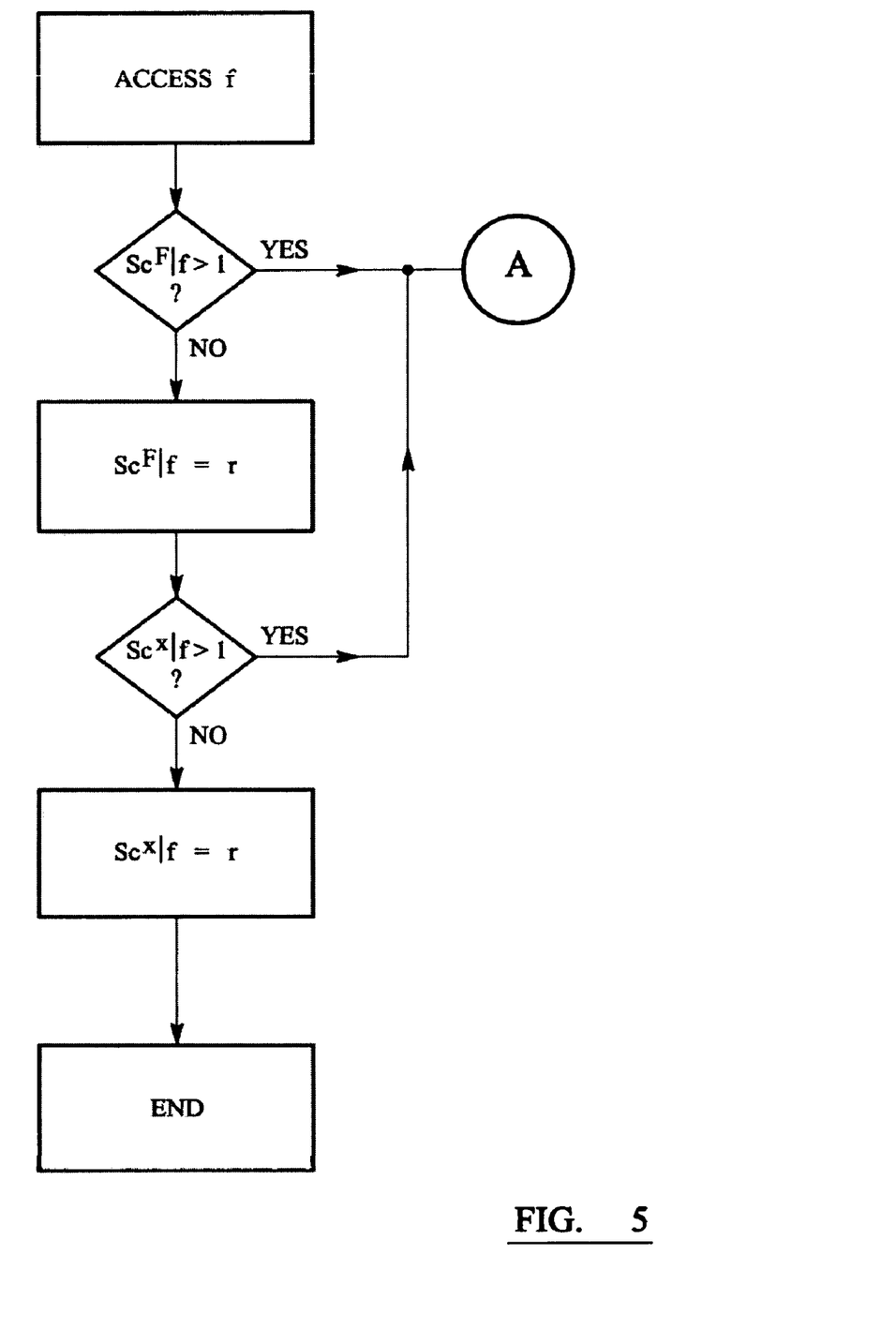
FIG. 5 is a flow diagram illustrating a portion of a method of applying rules to nodes, according to an exemplary embodiment of the invention.

Thus, consider the rules that have f in their scope and apply to compartment c, i.e. the set $S_c$|f. If $S_c^F$|f has one file rule r in it, then the result is obvious: the permissions defined by S for f in c are those in r. If $S_c^F$|f is empty, no file rules apply, and P is conferred, where P is the set of all permissions. Similarly, if $S_c^X$|f has one exec rule r in it, the attributes are those in r. If $S_c^X$|f is empty, no exec rules apply, and f has no exec attributes, as illustrated in FIG. 5 of the drawings.

However, in the case where $S_c^F$|f or $S_c^X$|f contains more than one rule, it is necessary to employ the general concept of "most specific" rule, as mentioned above. One way which has been proposed to find the 'most specific' rule for a file, is to start at the file's inode and go up to the parent chain in the dentry until an inode with a rule is found. If there is more than one parent chain associated with an inode, the rule associated with nearest inode is selected. However, this approach does not always provide satisfactory results, for example, in the case where there are two parent chains in which the nearest inodes having rules associated with them are equally close to the inode of interest.

Figure 6:
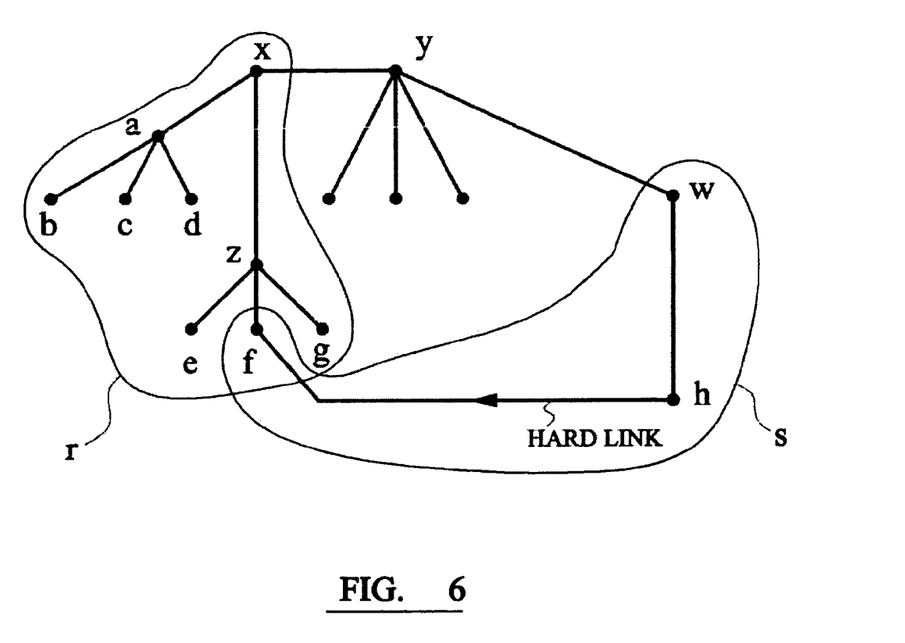
FIG. 6 is a schematic diagram illustrating a simplified filesystem in which two rules conflict.

In accordance with the present invention, an alternative approach is employed, in which scope inclusion is assessed when deciding on which rule to apply to an inode. Firstly, let us define the term 'conflict'. Rules r and s conflict if their attributes are not equal and there exists a file f in both their scopes reachable from r's filename without passing through s's filename (or vice versa), as illustrated in FIG. 6 of the drawings, in which rule r is applied at node x and rule s is applied at node w. File f is accessible from x via z, and also via w via a hard link from h, i.e. file f is in the scope of both rules r and s, and is reachable from r's filename (x) without passing through s's filename (w), and vice versa. Thus, if the attributes of rules r and s are not equal, there is said to be a conflict between rules r and s. On the other hand, a set of rules may be considered consistent if no rules in it conflict.

Figure 7:
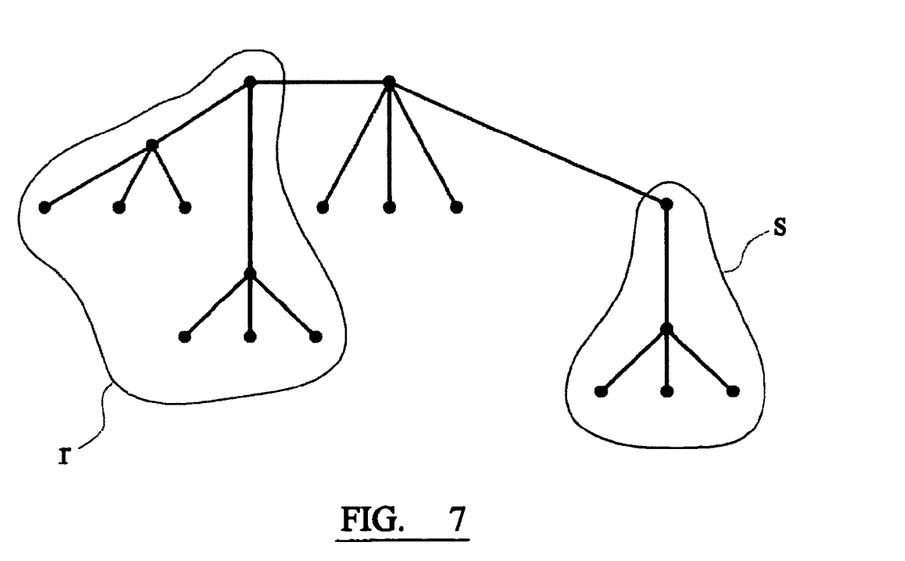
FIG. 7 is a schematic diagram illustrating a simplified filesystem in which two rules do not conflict.
Figure 8:
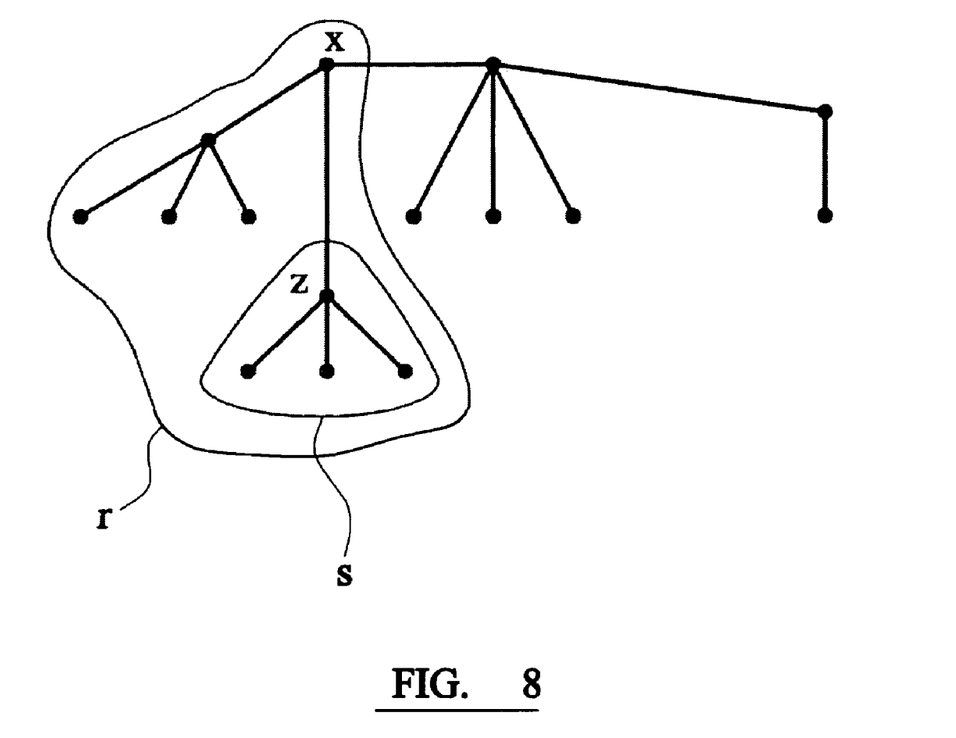
FIG. 8 is a schematic diagram illustrating a simplified filesystem in which one rule is a complete subset of another rule.

Now consider the case where two rules have differing attributes. If their scope does not intersect at all, as shown in FIG. 7 of the drawings, then they can be considered to be consistent, as they do not conflict. However, if the two rules have differing attributes, and file f exists in both of their scopes, the rules are said conflict unless the scopes 'nest'. 'Nesting' can be defined, as follows:

Given rules r and s, with filename files x and z respectively, it can be said that the scope of s nests in the scope of r if $s \subset r$ and every file in s is only reachable from x on a path through z. Thus, referring to FIG. 8 of the drawings, it can be seen that the scope of rule s nests in the scope of rule r because s is a complete subset of rule r and every file in the scope of rule s is only reachable from filename x on a path through filename z. Thus, in accordance with this exemplary embodiment of the invention, if s is less general than r, and the scope of s nests in the scope of r, then s is applied to file z as the most specific rule. However, in the example illustrated in FIG. 6 of the drawings, the scope of s does not nest in the scope of r, but the scopes do intersect, another rule must be applied to select the rule applicable to file f. In accordance with this exemplary embodiment of the invention, the rule to be applied to file f is determined by selecting the most restrictive of rules r and s.

Figure 9:
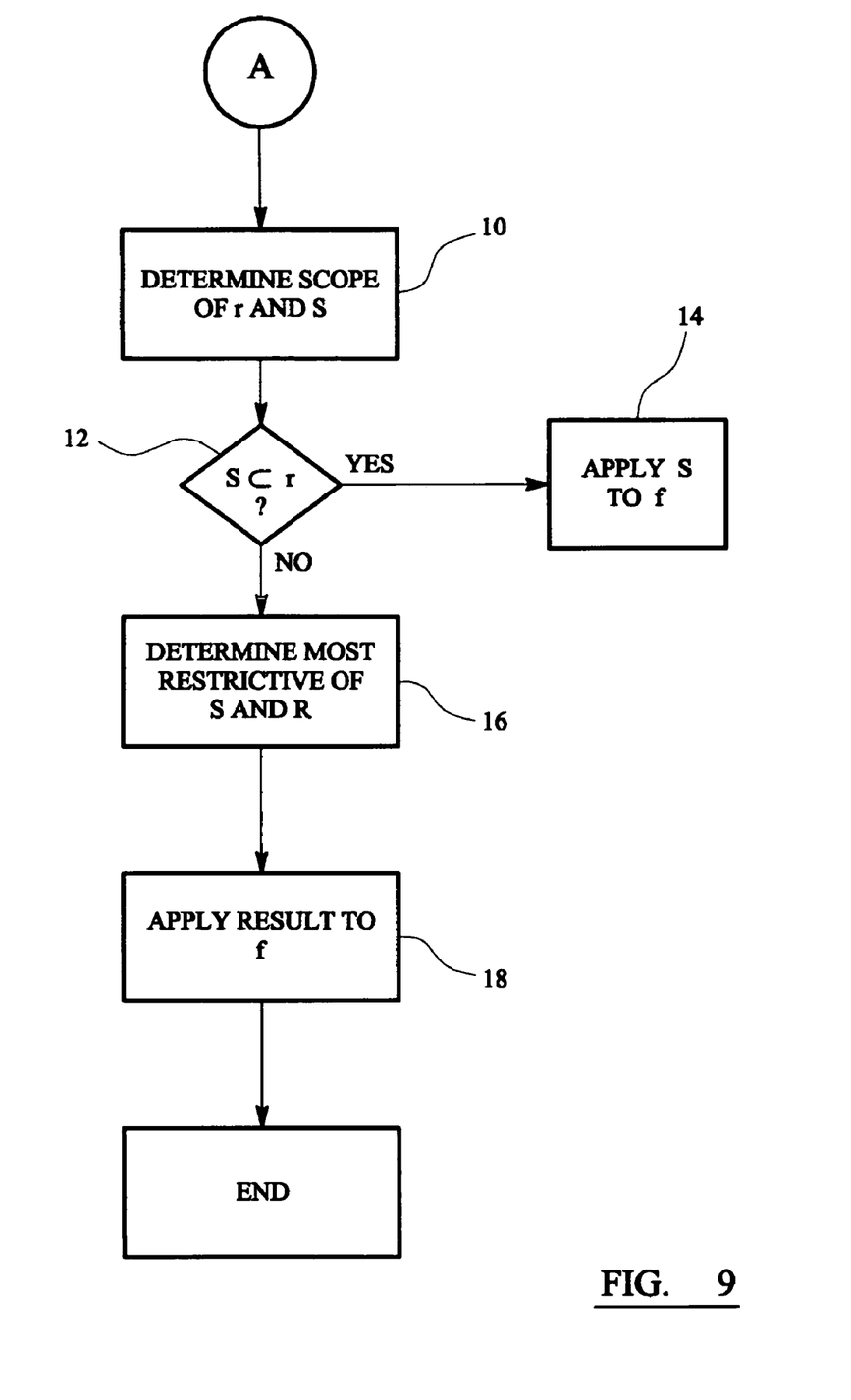
FIG. 9 is a flow diagram illustrating another portion of the method of FIG. 5.

Thus, referring to FIG. 9 of the drawings, a simplified method according to this exemplary embodiment of the invention continues from A, after it has been determined that the fire f lies within the scope of two rules r and s. At step 10, the scope of rules r and s is determined. At step 12, it is determined whether r is a complete subset of s (or vice versa). If yes, the rule whose scope is a complete subset of the other rule is applied to file f at step 14. Otherwise, it is determined at step 16 which of the two rules is most restrictive, and the most restrictive rule is applied to file f at step 18. It is preferred that, when the scope of each rule is determined, symbolic links are not followed unless the rule's path itself denotes a symbolic link.

The above-described process avoids the problems associated with links, as explained above. However, although a link can generally never widen permissions, it can narrow them, by causing intersection. In accordance with one embodiment of the invention, a solution to this problem would be to provide means for detecting the creation of a link which creates a rule conflict and either preventing its creation or removing it, thereby causing a failed operation. Alternatively, means could be provided for identifying the creation of a rule conflict when a link between files or sets of files is created, and providing an error message or warning accordingly.

Exec rules set properties rather than just permissions. As with file rules, exec rule s is 'more specific' than exec rule r if r and s have the same compartment and the fileset of s is a proper subset of the fileset of r. However, if the rules have intersecting filesets, but neither fileset is a proper subset of the other, the rules are said conflict. Thus, for example, if r and s potentially apply to node f, and r states 'use compartment x' and s states 'use compartment y', there is a very clear conflict to be resolved. In accordance with an exemplary embodiment of the invention, the last-added rule is chosen to be applied to node f, and an error message may be raised to warn a user of the conflict. In order to resolve this, once alerted, the user may simply define another rule t to be applied specifically to node f, which rule would then take precedence over both rules r and s.

Thus, the apparatus and method of the illustrated embodiment reliably determines whether a rule applies to a node, irrespective of which way that node is accessed or the order in which the rules are loaded, using most preferably, the above-described most specific/last added rule determination. It also provides for accurate tracking of what rule currently applies to a node, irrespective of its name.

In order to maintain a correct view of which file rules apply to which files, operations modifying the file namespace may be monitored, i.e. File create, file rename, link create, link delete, mount, unmount.

An embodiment of the present invention has been described above by way of example only, and it will be apparent to a person skilled in the art that modifications and variations can be made to the described embodiments without departing from the scope of the invention as defined by the appended claims.

The invention claimed is:

1. A system comprising
   a trusted computing platform,
   one or more logically protected computing environments and
   a filesystem comprising a plurality of files and links defining access paths between said files,
   the system being arranged to load onto said trusted computing platform a predetermined security policy including a plurality of security rules in respect of one or more of said logically protected computing environments and/or said files,
   the system being further arranged to:
   (1) determine that first and second security rules apply to a specified file or set of files,
   (2) determine the complete set of files, or fileset, to which each of said first and second security rules applies,
   (3) determine if the fileset of said first security rule is a complete subset of the fileset of said second security rule, and if so,
      a. applying said first security rule to said specified file or set of files, and otherwise,
      b. selecting one of said first and second security rules on the basis of another attribute thereof, and applying the selected security rule to said specified file or set of files.

2. A system according to claim 1, wherein said security rules comprise or include a plurality of file rules defining discretionary access controls in respect of one or more of said logically protected computing environments and/or files.

3. A system according to claim 1, wherein said security rules comprise or include a plurality of execution control rules defining or modifying security attributes in respect of one or more of said logically protected computing environments and/or files.

4. A system according to claim 2, wherein in said first and second security rules are file rules, and the fileset to which said first security rule applies is not a complete subset of the fileset to which the second security rules applies, the system is arranged to determine which of the first and second security rules is the most restrictive, and apply that rule to said specified file or set of files.

5. A system according to claim 3, wherein said first and second security rules are execution control rules and the fileset to which said first security rule applies is not a complete subset of the fileset to which said second security rule applies, the system is arranged to select and apply the rule which was most recently added to the security policy.

6. A system according to claim 5, arranged to provide a warning or error message indicating to a user that a rule conflict exists.

7. A system according to claim 1, including means for identifying the creation of a rule conflict when a link between files or sets of files is created and providing an error message or warning accordingly.

8. A system according to claim 7, arranged to remove the offending link to remove the conflict.

9. A method of applying a predetermined security policy to a system having trusted computing platform, one or more logically protected computing environments and a filesystem comprising a plurality of files and links defining access paths between said files, said security computing environments and/or said files, the method carried out by the system comprising the steps of:
   determining that first and second security rules apply to a specified file or set of files,
   determining the complete set of files, or fileset, to which each of said first and second security rules applies,
   determining if the fileset of said first security rule is a complete subset of the fileset of said second security rule, and if so,
      a. applying said first security rule to said specified file or set of files, and otherwise,
      b. selecting one of said first and second security rules on the basis of another attribute thereof, and applying the selected security rule to said specified file or set of files.

10. A method according to claim 9 wherein the security rules define access controls and/or modify security attributes.

* * * * *